Figure 1:
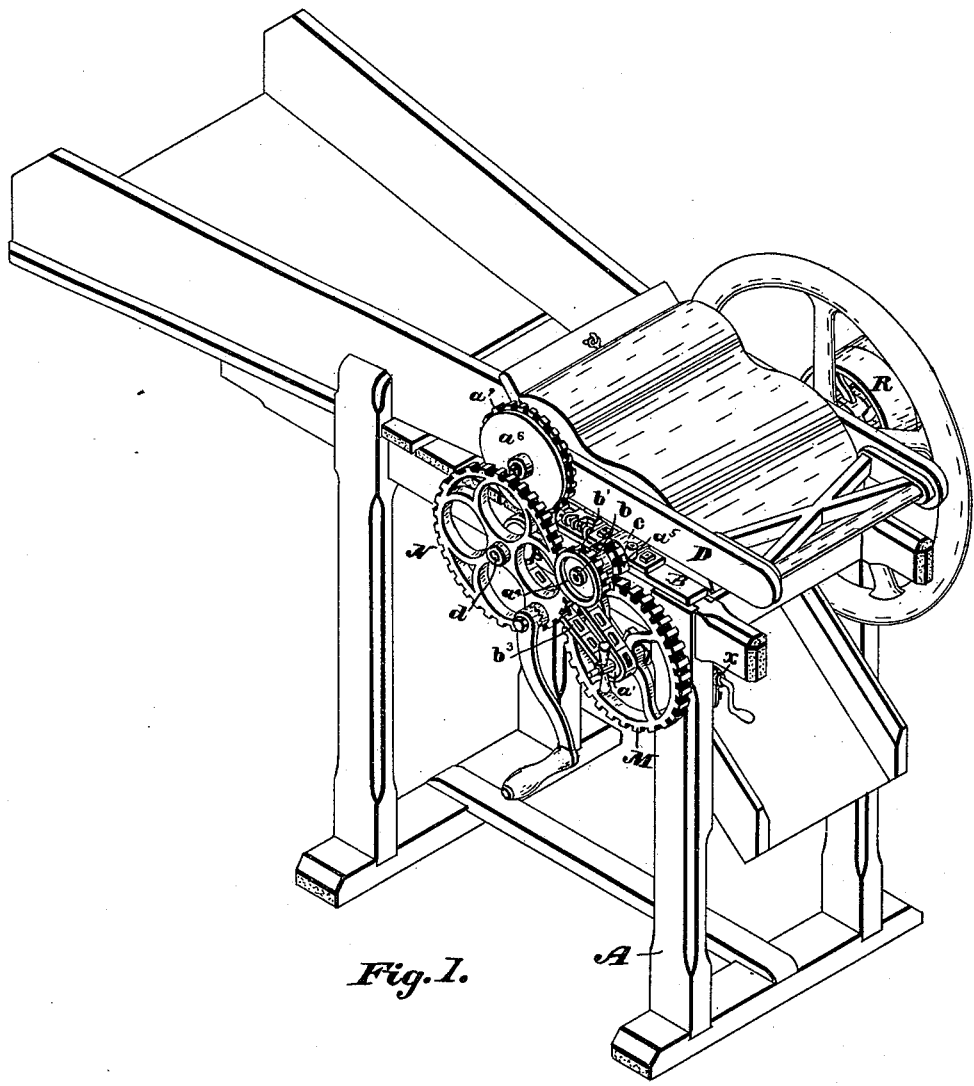

(No Model.) 3 Sheets—Sheet 1.

A. P. GOULD & H. R. SPENCER.
FODDER CUTTER.

No. 360,010. Patented Mar. 29, 1887.

WITNESSES:
Harry Frease.
Chas. R. Miller

INVENTORS
Aaron P. Gould
and
Herbert R. Spencer
By W. K. Miller ATTORNEY

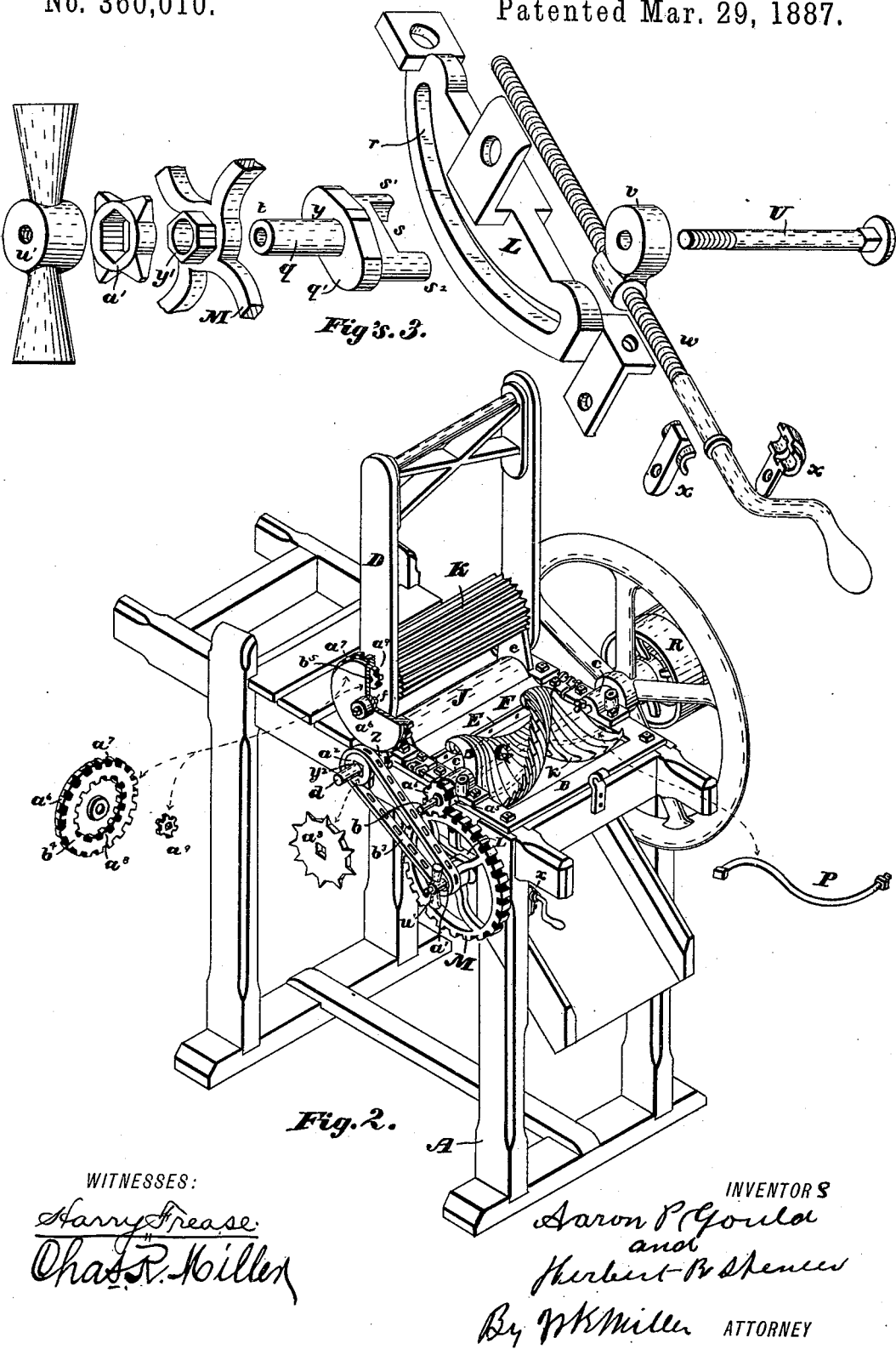

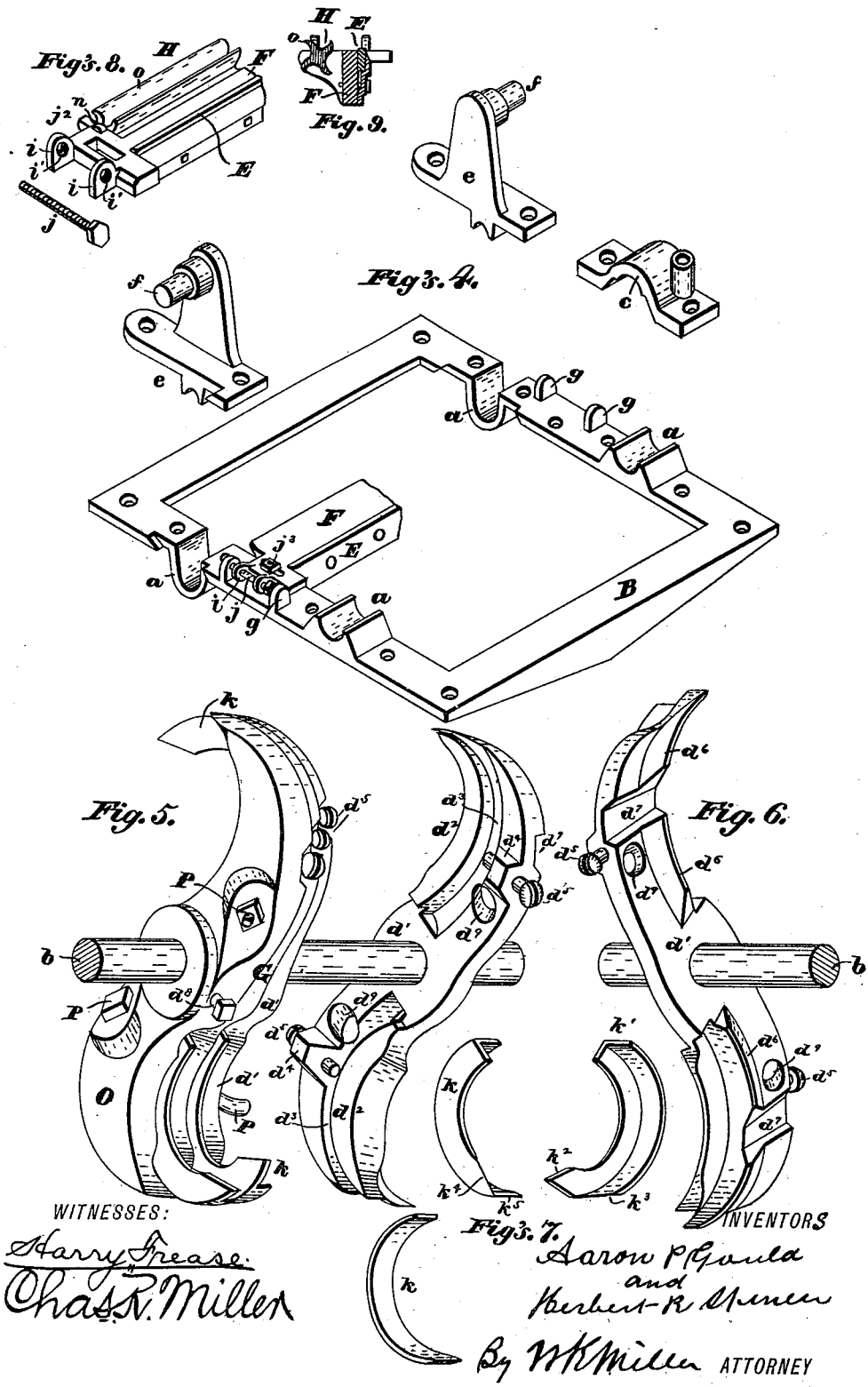

UNITED STATES PATENT OFFICE.

AARON P. GOULD AND HERBERT R. SPENCER, OF CANTON, OHIO.

FODDER-CUTTER.

SPECIFICATION forming part of Letters Patent No. 360,010, dated March 29, 1887.

Application filed July 14, 1886. Serial No. 207,973. (No model.)

*To all whom it may concern:*

Be it known that we, AARON P. GOULD and HERBERT R. SPENCER, citizens of the United States, and residents of Canton, county of Stark, State of Ohio, have invented a new and useful Improvement in Fodder-Cutters, of which the following is a full, clear, and exact description, reference being had to the accompanying drawings, making part of this specification.

Our invention relates to improvements in straw and fodder cutters; and it consists in the parts and combination of parts, as will be more fully explained, and pointed out in the claims.

In the accompanying drawings, in which the first eight are in perspective, Figure 1 represents the improved straw and fodder cutter from the front of left-hand corner, showing the parts in normal position; Fig. 2, a view with the cover removed, showing the location of the working parts; Fig. 3, a view of the parts for the support and adjustment of the feed gear-wheel; Fig. 4, a view of the gear-supporting frame and journal-boxes; Fig. 5, a view showing the knife-supporting arms on the shaft; Fig. 6, a view of the reverse side of the knife-supporting arm; Fig. 7, a view of the cutting-knives. Fig. 8 is a view of a modified construction, and Fig. 9 is a view in section of the same.

Similar letters of reference indicate corresponding parts in all of the figures of the drawings.

A represents the main supporting-frame; B, the metal gear-supporting frame, which is placed upon and is secured by bolts to the main frame A, and which is provided with journal-boxes $a\ a$, for the support of the cutter-head shaft $b$, which is held in position by the binders; $c\ c$ journal-boxes for the support of feed-roller $d$, held in position by binders $e\ e$, which also support the pivotal pin $f$, about which the frame D may be oscillated. (See Fig. 2.) Said frame B is also provided with upwardly-projected lugs $g$, which will be hereinafter explained.

The stationary knife E is supported on cross-bar F, which is provided with outwardly-projected lugs $i\ i$, having threaded perforations $i'$ and a threaded setting-bolt, $j$, slot $j^2$, and tightening-bolt $j^3$. This same provision for adjustment is made at both ends of the bar F, the ends resting on frame B between the lugs $g\ g$, the setting screw $j$ turned into the lugs $i\ i$, the ends resting against the lugs $g$. By turning this bolt $j$ the knife-supporting bar F, with the knife E, may be moved on the frame B to or from the cutter-head G, and when adjusted to the revolving cutters $k$ may be fixed in said adjustment by tightening the bolt $j^3$, which passes through a perforation in the frame B and the slot $j^2$ in cross-bar F. There may also be provided in said cross-bar F journal-bearings $n$ for a grooved roller, H. This said roller is so placed and adapted for the purpose of raising the ends of the straw and carrying them over onto the knife E, and thus prevent the straw being drawn down between the feed-roller J and rear edge of the bar F. Said roller H is rotated by the moving straw as fed in by the feed-rollers J and K. The straw, striking the tooth $o$, is raised up and passed over and onto the knife E.

A drop-hanger, L, is provided for the support of an adjustable axle-pin, $q$, upon which the feed-actuating gear-wheel M may be rotated. Said hanger is provided with a slot, $r$, semicircular in form, the center of the described circle being the center of the cutter-head shaft $b$. The said axle-pin $q$ is provided with a base-plate, $y$, that rests against the outer face of the hanger L and a bifurcated section, $s$, that may be passed through the slot $r$. A longitudinal perforation, $t$, is provided for the bolt U, by which the swivel-nut $v$ may be attached to the inner end of the axle-pin $q$, between the prongs $s'$ and $s^2$ of the bifurcated section $s$.

The adjusting screw $w$ may be attached to the supporting-frame A by the box $x$. The object of this arrangement is to provide means by which the speed of the feed-roller may be regulated, so as to allow the fodder to be cut into desired lengths. To accomplish this object, sprocket-wheels $a'$, $a^2$, and $a^3$ may be of uneven size and interchangeable, each of the said wheels being adapted to the hub $y'$ of wheel M and hub $y^2$ on wheel $z$. These changes may be made by removing the nut $u'$ from bolt U and gear-wheel N from roller-shaft $d$, said wheel being held in position by a projected flange, $b'$, on pinion $a^4$, being secured to cutter-head shaft $b$ by a set-screw. It will be necessary to remove this pinion $a^4$ to allow wheel N to be removed from roller-shaft $d$. After such an arrangement or combination of the sprocket-wheels as to give the desired speed to the feed-rolls, the wheel N, pinion $a^4$, and nut $u'$ may be replaced, the chain $b^3$ put in without changing its length, and tightened by the use of the screw $w$. By this screw $w$ the axle-spindle $q$ may be moved to and from the center of pinion $z$, thereby keeping the cogs of wheel N always engaged with cogs of pinion $a^5$ on the cutter-head shaft. Wheel $a^6$ is mounted loosely on and may be rotated about the outer end of the projecting pin $f$ on binder-cap $e$. Said wheel is provided with a double set of gear teeth or cogs—one a face or external gear, $a^7$, the other an internal gear, $a^8$. Both sets of gears are projected from the same rim, $b^4$. The peripheral or face teeth $a^7$ engage with the teeth of pinion $z$, which is mounted on roller-shaft $d$—the supporting-shaft of feed-roll J. The internal set of gear-teeth, $a^8$, engage with the teeth of pinion $a^9$, which is mounted on the end of roller-shaft $b^5$—the supporting-shaft of roller K. The journal-bearings of shaft $b^5$ rest in perforations in the swinging frame D, said frame having a pivotal connection about the pin $f$ on binder-cap $e$, which also forms a support for wheel $a^6$, thus allowing the pinion $a^9$ to be rotated about the wheel $a^6$ without disengagement, and the roller K to rise or fall, adapting itself to the straw between the rollers K and J, also securing a constant pressure and driving feed-power on the straw or fodder to be cut, by reason of the weight of the frame D, which may be further increased by weights placed on the outer end of frame D.

The operation of the entire gear is as follows: Crank-wheel N, mounted loosely on shaft $d$, engages with pinion $a^4$, mounted on the end of the cutter-head shaft $b$, and to which is connected pinion $a^5$. (See Fig. 2.) This pinion engages with wheel M. Sprocket-wheel $a'$ is mounted on the hexagonal hub $y'$ of wheel M. Said sprocket $a'$ is connected with a sprocket-wheel, $a^2$ or $a^3$, as the case may be, by a chain, $b^3$, said sprocket being mounted on the hub of pinion $z$, which is mounted on shaft $d$, said pinion $z$ engaging with the face peripheral gear $a^7$, by which wheel $a^6$ is rotated, the internal gear, $a^8$, engaging with pinion $a^9$, by which feed-roller K is rotated; or, when driven by power, bringing into use pulley R, pinion $a^5$ becomes the first driver.

The cutter-head is composed of a series of S-shaped knife-supporting arms, $d'$, provided on their outer ends with semicircular shoulders, $d^2$, and corresponding semicircular grooves, $d^3$, (see Fig. 5,) formed on a radius of about one and one-fourth inch, and adapted to support a cutting-knife, $k$, of similar semicircular forms, and adapted to rest upon and against said shoulders. The cutting-knife $k$ may be made of angle-plate steel of about one-half by one-half inch, by number sixteen, and curved on a radius of about one and one-fourth inch, and adapted to the hereinbefore-mentioned shoulders $d^2$. In the rear of said groove $d^3$ there is provided a lug, $d^4$, adapted to receive a set-screw, $d^5$, by which the knife $k$ may be held in position. As a further support to said cutter-knife $k$ there is provided on the opposite side of the arm $d'$ an elevated rib or shoulder, $d^6$, (see Fig. 6,) of semicircular form, that coincides with the form of shoulder $d^2$, and having a cross-groove, $d^7$, adapted to set over the lug $d^4$. Two outside arms, O, are provided with set-screws, $d^8$, by which they are secured to the shaft $b$.

The construction of the cutter-head is as follows: Fix the arm O to the shaft, as shown in Fig. 5, pass the desired number of arms on the shaft from the outer end up to and against the arm O, the back of the cutting-blade $k$ secured to the shoulder $d^2$ by set-screws $d^4$, and resting against the rib $d^6$ on the arm O, and as each arm takes its place on the shaft, the cutting-knives dropping in place, one in front of the other, a double spiral cutter is formed. The arms may now be secured by the spiral bolt P, passed through perforations $d^9$. (See Fig. 2.) The tension on this bolt, having a tendency to straighten it, draws the rib $d^6$ against the back of the knife, securing them in their proper working position. To remove a cutter-blade or knife, $k$, the nuts on the bolts P may be slackened, the set-screw turned off, and the blade removed.

The blades $k$ may be formed as shown in Fig. 7, $k'$ having a splitting-point, $k^2$, in advance of the cutting-edge $k^3$. The knife $k$, both angles $k^4$ and $k^5$, are reduced to a cutting-edge. Blade $k^6$ may be made of plate-steel, one-half inch by No. 16 gage, and formed to a circle, as hereinbefore mentioned. The object of so forming the knife-supporting shoulders and forming the cutting-blades thereto is that the cutting-edge may be maintained on a fixed line of outside diameter of the cutter-head, so that should a blade become loose, work forward or out, no part of the blade may reach the cutting-edge of the stationary knife E, and should the cutting-edges fall back or move forward or out they will always maintain an even outside line of diameter or cutting-edge.

Having thus fully described the nature and object of our invention, what we claim, and desire to secure by Letters Patent, is—

1. In a fodder-cutter head, an S-shaped knife-supporting arm adapted to support a cutting-blade on each of its ends, as described, each arm having a groove or recess at each end at points immediately over the cutters for the reception of corresponding ribs on the next adjacent arm, whereby the cutters are prevented from lateral displacement and the arms locked together for the purpose of forming spiral cutters, as described, and for the purpose set forth.

2. In a fodder-cutter head, a knife-supporting arm, $d'$, having a knife-supporting shoulder, $d^2$, groove $d^3$, rib $d^6$, groove $d^7$, lug $d^4$, set-screw $d^5$, and perforations $d^9$, substantially as described, and for the purpose set forth.

3. In a cutting-head for a fodder-cutter, the combination of a shaft, $b$, knife-supporting arms $d'$ having knife-supporting shoulders, and a spiral through-bolt, P, by which the arms may be held in position, substantially as described, and for the purpose set forth.

4. The combination, with a shaft, of a series of S-shaped arms, each having a central opening, and provided at its ends on one face with an arc-shaped shoulder, and at its ends on its opposite face with ribs, and the knives shaped to conform to the shoulders and having flanges adapted to rest against the outer faces of the arc-shaped flanges, and screws passing through projections or lugs on the arms and bearing against the backs of the knives.

5. The combination, in a cutting-head for a fodder-cutter, of a series of S-shaped arms, each having on its outer ends circular knife-supporting shoulders and lugs $d^4$, circular-formed knives adapted thereto, whereby a given diameter may be maintained, and screws secured in the lugs $d^4$ and bearing against the backs of the knives, substantially as described, and for the purpose set forth.

6. The combination, in a fodder-cutter, of the main frame, the rectangular metallic frame B, secured thereto and having journal-boxes $a$, adjustable knife-supporting bar F, and knife E, substantially as described, and for the purpose set forth.

7. The combination, in a fodder-cutter, of a frame, B, having lugs $g$, adjustable knife-supporting bar F, having lugs $i$, the latter provided with threaded perforations, and adjusting-screws $j$, substantially as set forth.

8. In a fodder-cutter, the combination of the main frame, the rectangular frame B, secured thereto, the knife-bar F, adjustably secured to the frame B, and the roller H, journaled in bearings on the knife-bar, substantially as set forth.

9. The combination of frame B and cutters of the knife-bar F, adjustably secured to said frame and provided with bearings $n$, and the roller H, mounted in said bearings, substantially as set forth.

10. The combination, in a fodder-cutter, of a gear-supporting frame having journal-boxes $a$, binder-caps $e$, having vertical standards, and projecting axle-pins $f$, about which frame D may be oscillated, roller K, pinion $a^9$, supporting-frame D, and a gear-wheel, $a^6$, having an outwardly-projected gear, $a^7$, and an inwardly-projected gear, $a^8$, substantially as shown and described, and for the purpose set forth.

11. In a fodder-cutter, the combination, with a gear-supporting hanger having a curved supporting-slot and a gear-supporting axle-pin, the inner end of which is constructed to slide in said elongated slot, of a swivel-nut loosely secured to the inner end of the axle-pin, a screw for adjusting said nut, and a screw passing through the nut and axle for locking them against displacement, substantially as set forth.

12. In a fodder-cutter, the combination, with a hanger having a curved bearing-slot, a gear-wheel, a sprocket-wheel adapted to turn with said gear-wheel, and an axle-pin adjustable in the slot of the hanger, of a rotary cutter-head shaft having a pinion engaging the gear-wheel, a feed-roller-actuating wheel, a sprocket-wheel adapted to turn with said feed-roller-actuating wheel, and a chain connecting said sprocket-wheels, substantially as set forth.

13. In a fodder-cutter, the combination, with a rotary shaft, of a series of S-shaped arms, each having an arc shaped shoulder and projections $d^4$ on one face near its opposite ends, and on its other face near its opposite ends provided with ribs, the latter being cut away for the reception of the lugs $d^4$ of the next adjacent arm, arc-shaped knives resting on said shoulders, and screws passing through the lugs $d^4$ and engaging the knives, substantially as set forth.

In testimony whereof we have hereunto set our hands this 9th day of July, A. D. 1886.

AARON P. GOULD.
HERBERT R. SPENCER.

Witnesses:
W. K. MILLER,
CHAS. R. MILLER.